June 2, 1970     A. L. HATCHER, JR., ET AL     3,515,487
METHODS AND APPARATUS FOR MEASURING THE AREA OF AN ARTICLE
Filed Dec. 20, 1966     2 Sheets-Sheet 1

INVENTORS
A.L. HATCHER, JR.
A.G. NAYLOR
BY
ATTORNEY

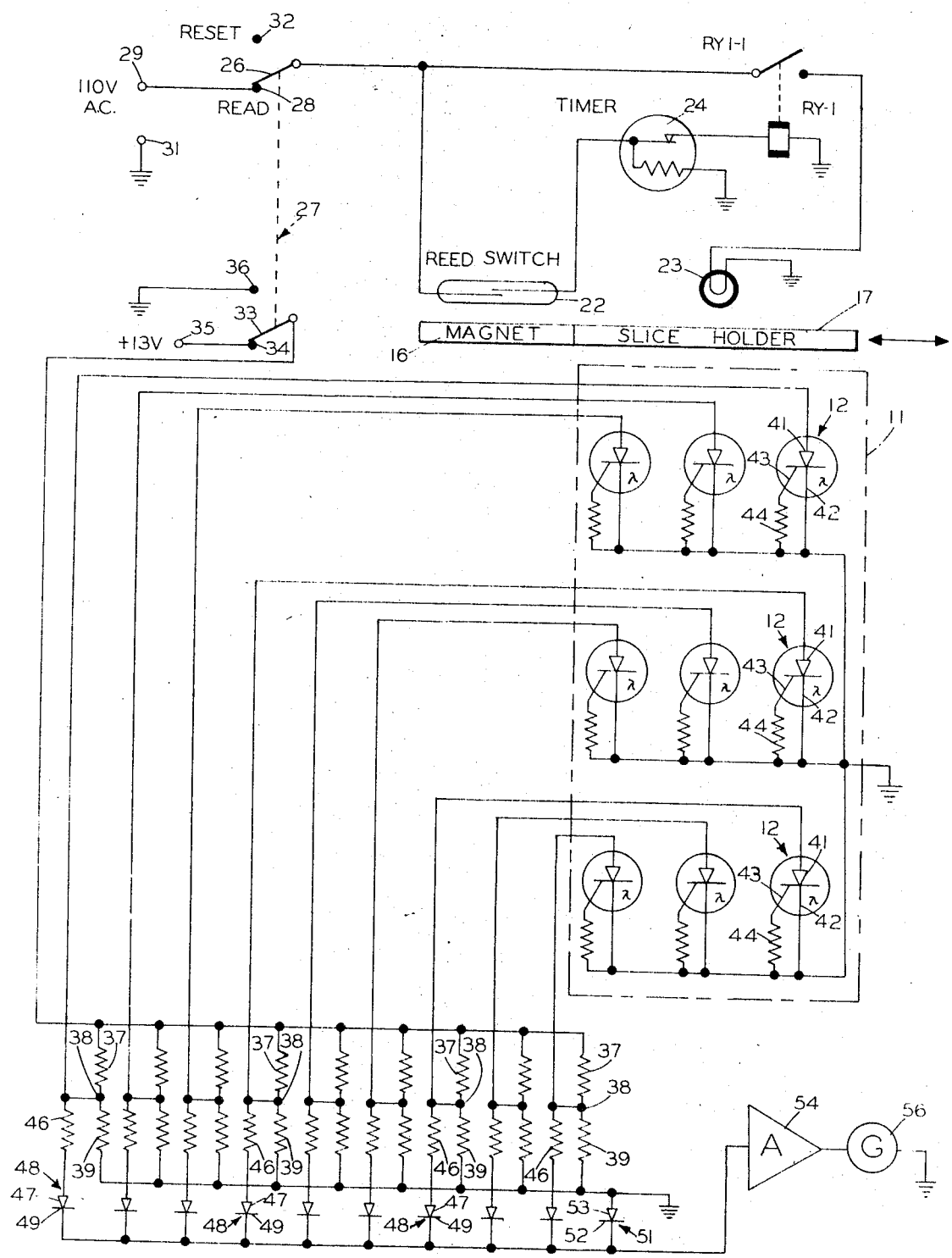

United States Patent Office 3,515,487
Patented June 2, 1970

3,515,487
METHODS AND APPARATUS FOR MEASURING THE AREA OF AN ARTICLE
Arthur L. Hatcher, Jr., Sinking Springs, and Arthur G. Naylor, Wyomissing, Pa., assignors to Western Electric Company, Incorporated, New York, N.Y., a corporation of New York
Filed Dec. 20, 1966, Ser. No. 603,352
Int. Cl. G01b 11/28
U.S. Cl. 356—157                         7 Claims

ABSTRACT OF THE DISCLOSURE

The area of an article can be measured by inserting same between an array of light-activated silicon controlled rectifiers connected in parallel, and a light source. The rectifiers are so arranged that each produces a negligible output upon receiving light energy and produces an output signal upon the absence of light energy. Circuitry is provided for summing the output signals.

---

Figure 1:
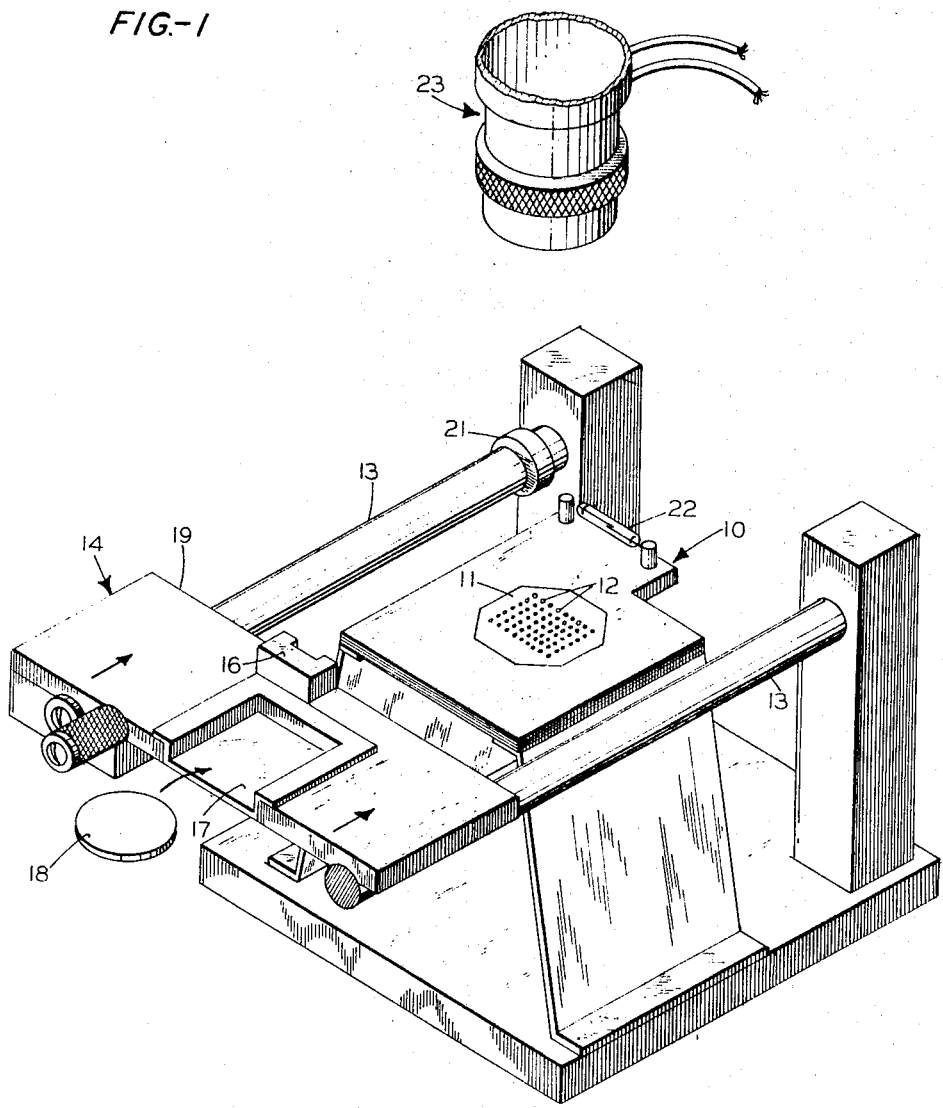

The present invention relates generally to methods of and apparatus for measuring the surface area of an article, and more particularly to methods of and apparatus for measuring the planar area of a semiconductor slice. Accordingly, the general objects of the invention are to provide new and improved methods and apparatus of such character.

Various devices have been proposed, in the past, for measuring the surface area of an article. Generally, the prior art teaches the insertion of the article between a light source and a photoelectric cell such that the total quantity of light received by the photoelectric cell is a function of the area. A galvanometer is connected to the photoelectric cell to indicate the amount of light received by the cell. Such prior art devices were subject to error due to aging of both the light source and the photoelectric cell, and due to changes in their performance or response. These devices operated on an analog basis and were subject to erroneous readings. Digital devices of the prior art were directed to non-related systems for counting articles in motion.

Thus, it is an object of this invention to provide a novel electro-optical system for measuring the surface area of an article that operates on a digital principle, utilizing devices which produce electrical outputs upon receiving at least some predetermined threshold level of light energy.

The foregoing and other objects are accomplished, in accordance with certain features in the invention, by providing an array of photosensitive elements electrically connected in parallel and arranged to receive light from a source partially interrupted by an opaque article, each element being characterized as producing a first type of electrical output signal (e.g., nil) upon receiving at least a predetermined threshold level of light energy and producing a second type of output signal (e.g., a voltage level at one polarity) upon the absence of the threshold level, and coupling each of the photosensitive elements to sum the output signals in a digital manner.

The opaque article can be held between the light source and the array by a transparent sheet which is movable into and out of alignment therewith such that the article covers at least a certain portion of the array. When the sheet is moved between the array and the light source, an electrical circuit activates the light source. Such circuit includes a magnet affixed to the transparent sheet and a normally opened reed switch, coupled to the array, which is adapted to be closed by the magnet when the sheet is positioned between the light source and the array. The reed switch, a timer, and a relay coil are serially coupled across a voltage source such that, with the reed switch closed, the relay coil energizes and after a fixed time interval de-energizes, operating a pair of normally-open relay contact terminals. The relay contact terminals and the light source are serially coupled across a voltage source. A ganged switch can be provided for resetting the apparatus.

The array may include a plurality of light activated silicon controlled rectifiers having their cathodes and gate electrodes coupled to points of reference potential. The anodes of the light activated silicon controlled rectifiers are coupled to respective junctions of pairs of serially connected resistors which pairs are each coupled across a voltage source. The output signals from the light activated silicon controlled rectifiers can be summed by connecting the anodes of a plurality of diodes respectively to the junctions of the serially connected resistors, all the cathodes of the diodes being coupled together to an ammeter to indicate the total current flowing through each of the diodes, and hence, the area of the opaque article.

Other features of the invention include inserting the article between a light source and an array of photosensitive electrical elements such that an integral number thereof are unaffected by light; electrically summing the integral number to achieve a value which is a function of the cross-sectional area of the article; and visually indicating the electrical sum.

Other objects, advantages and features of the invention will be apparent from the following detailed description of a specific embodiment thereof, when taken in conjunction with the appended drawings, in which:

FIG. 1 is a perspective view which generally illustrates the mechanical features of the invention; and FIG. 2 is a diagram which generally indicates the electrical features of the invention.

Referring to FIG. 1, a fixture 10 supports a board 11 holding one hundred light activated silicon controlled rectifiers 12—12 in a planar array. The fixture 10 includes a pair of guides 13—13 which supports a slide 14 for reciprocal manual movement thereon. The slide 14 carries a magnet 16 and supports a transparent window 17 centrally oriented thereon. An article 18 of unknown cross-sectional area, such as an approximately round semiconductor slice, may be seated onto the transparent window 17 of the slide 14 and moved inwardly of the fixture 10 until an innermost edge 19 of the slide 14 abuts a stop 21 mounted on one of the guides 13. With the slide 14 in abutment with the stop 21, the window 17 becomes centered directly over the board 11. When the slide 14 is moved so that the edge 19 abuts the stop 21, a reed switch 22 supported by the fixture 10 comes into the magnetic field of the magnet 16, closing the normally-open contacts of the switch 22. As set forth in greater detail hereinafter, the closure of the contacts of the switch 22 initiates the operation of the circuitry for determining the area of the opaque article.

The light activated silicon controlled rectifiers 12—12 (also termed "LASCR's") receive light during the operation of the circuit from a light source 23 which is located directly above the fixture 10 and, more particularly, directly above the center of the board 11.

Referring to FIG. 2, there is shown the reed switch 22 and the light source 23, such as a lamp, in diagrammatical association with the magnet 16 and the transparent window 17 which acts as a slice holder. The reed switch 22, a timer 24, and a relay coil RY1 are serially coupled to a point of reference potential. One arm 26 of a double pole-double throw switch 27 is connected to the reed switch 22. The arm 26, when in its READ position as illustrated, is coupled to a contact 28 which connects to a terminal 29 for receiving a suitable voltage source such as 110 volts A.C., the source being referenced by a terminal 31 to a point of reference potential, such as ground. The arm 26 can be switched from the contact 28 into engagement with an unconnected contact 32, designated: RESET.

The arm 26 is coupled, also, through relay contacts RY1–1 (associated with the relay coil RY1), and the light source 23 serially to a point of reference potential, such as ground. The normally-open contacts RY1–1 are closed when suitable energizing current is applied through the relay coil RY1.

The other arm 33 of the switch 27, when in its READ position, is coupled to a contact 34 which is connected to a terminal 35 for receiving a suitable voltage source, such as +13 volts. When the switch 27 is placed into its RESET position, the arm 33 is coupled to a contact 36 which is connected to a point of reference potential, such as ground. The arm 33 is coupled to one end of each of a plurality of resistors 37—37. The other ends of the resistors 37—37 are connected, at junctions 38—38, to respective one ends of associated resistors 39—39 having their other ends coupled to a point of reference potential, such as ground.

As shown in FIG. 2, each junction 38 is connected to a respective anode 41 of the LASCR's 12—12. The cathodes 42—42 of the LASCR's 12—12 are connected to a point of reference potential, such as ground. Each of the gate electrodes 43—43 of the LASCR's 12—12 is coupled through a respective gate resistor 44—44 to a point of reference potential, such as ground.

Output resistors 46—46 respectively connect the respective junctions 38—38 to the anodes 47—47 of respective diodes 48—48 having all their cathodes 49—49 connected together. A voltage regulating diode 51 has its cathode 52 coupled to the common junction of the cathodes 49—49 and has its anode 53 coupled to a point of reference potential, such as ground.

The common junction of the cathodes 49—49 and 52 are coupled through an amplifier 54 and galvanometer 56 to a point of reference potential, such as ground. The amplifier 54 may be adjustable and/or the galvanometer 56 may be calibrated so that the galvanometer scale reads the area of the article directly.

In accordance with one embodiment, the timer 24 is operative to de-energize its associated relay RY1 two seconds after the timer has been energized. Other values in accordance with one embodiment are as follows:

Resistors 37—37: 1000 ohms each.
Resistors 39—39: 5000 ohms each.
Resistors 46—46: 1 megohm each.
Resistors 44—44: 27K each.
LASCR's 12—12: SSPI SP30 type each.
Diodes 48—48: 1N457A type each.
Diode 51: 1N701 type.

OPERATION

Initially, the slide 14 is retracted from the board 11, as illustrated in FIG. 1. The double pole-double throw switch 27 initially is in reset position, each of the light activated silicon controlled rectifiers 12—12 being de-energized.

After placing the article 18, such as a silicon slice, onto the window 17 of the slide 14, the switch 27 is thrown to the READ position. The slide 14 is then advanced to the right, as viewed in FIG. 1, until its innermost edge 19 strikes the stop 21, whereby the window 17 becomes oriented directly above the board 11, and the magnet 16 is brought into proximity with the reed switch 22, causing the normally open contacts of the switch 22 to close. Current passes through the arm 26 of the switch 27, through the now-closed reed switch 22, to operate the timer 24 which first energizes and after a two second delay, de-energizes the associated relay coil RY1. The relay coil RY1, thereupon, actuates its associated relay contact RY1–1, first completing a circuit through the light source 23, thereby illuminating same and then after two seconds, opening the circuit.

Light from the source 23, partially interrupted by the opaque silicon slice in the window 17, is directed toward the light activated silicon controlled rectifiers 12—12 held by the board 11.

As stated hereinabove, in one embodiment, 100 light activated silicon controlled rectifiers are held in an array. However, for simplicity of illustration, only nine are illustrated in FIG. 2.

Light, upon impinging on certain ones of the LASCR's 12—12, causes conduction therethrough, such that the potential at the corresponding anodes 41—41 tends toward ground potential. Those LASCR's 12—12 which do not receive light from the source 23, due to being shadowed by the silicon slice held in the window 17, do not conduct, whereby their anodes 41—41 remain at the potential of the junction 38—38.

Thus, those junctions 38—38 associated with actuated LASCR's 12—12 are maintained at near zero potential. The remaining junctions 38—38, which are associated with those LASCR's 12—12 which were not actuated (hence, corresponding to the area of the article 18) are maintained at the same positive voltage level.

Equal quantities of current flow from those junctions 38—38 that are maintained at the same positive voltage level, through their associated output resistor 46 and diode 48, through the amplifier 54 and galvanometer 56 to the point of reference potential, such as ground. These equal quantities of current are summed in the junction of all the cathodes 49—49 of the diodes 48—48, whereby the current flowing through the meter 56 is a function of those LASCR's 12—12 which have not been actuated by the source 23. Thus, the current flowing through the meter 56 is a function of the area of the slice.

The switch 27 is thrown to its RESET position, deactivating the LASCR's 12—12 and resetting the timer 24 for the light source 23. The slice holding transparent window 17 and the magnet 16 are retracted with the slide 14, permitting the measured slice to be removed and a new slice to be replaced for subsequent measurement.

The accuracy of the area measurement, primarily, is a function of packing density and size of the LASCR's. Although those LASCR's which are not completely covered by a semiconductor slice produce outputs, the error introduced under such condition is relatively small and can be further reduced by taking measurements with the slice in different positions on the transparent window.

Measurements with errors less than 2% are believed obtainable with the specific embodiment described hereinabove.

While one specific embodiment of the invention has been described in detail hereinabove, it will be obvious that various modifications may be made from the specific details described without departing from the spirit and scope of the invention. In particular, while the invention is particularly advantageous for use in the measuring of surface area of flat articles, the invention may be practiced in much the same way for measuring the cross-sectional area of other shaped articles.

What is claimed is:

1. In apparatus for determining the area of an opaque article, including a light source, an array of photosensitive means electrically connected and arranged to receive light from said source partially interrupted by said opaque article, and means for holding said opaque article between said light source and said array, the improvement wherein:
    said array of photosensitive means comprises a plurality of light-activated silicon controlled rectifiers, so arranged that each said rectifier produces a negligible electrical output upon receiving at least a predetermined threshold level of light energy, and produces an output signal upon the absence of said predetermined threshold level; the improvement further comprising;

means connected to each of said rectifiers for summing said output signals.

2. The improvement as claimed in claim 1, wherein said holding means comprises:
a transparent sheet for receiving the article thereon, said sheet being movable into and out of alignment between said source and said array such that the article covers at least a certain portion of said array; the improvement which further comprises:
an electrical circuit for activating said light source when said sheet is moved between said array and said light source, and for deactivating said light source when said sheet is moved away from said array and said light source; wherein said circuit comprises;
a magnet coupled to said sheet;
a normally-opened reed switch, coupled to said array, adapted to be closed by said magnet when said sheet is positioned between said light source and said array;
means for receiving a voltage source;
a timer;
a relay including a coil and a pair of normally-open contact terminals;
means coupling said receiving means, said reed switch, said timer, and said relay coil serially to a point of reference potential such that, when voltage is applied to said receiving means and said reed switch is closed, the relay coil, for a fixed time interval is energized, closing said pair of relay contact terminals; and
means coupling said receiving means, said relay contact terminals, and said light source serially to a point of reference potential.

3. The apparatus as claimed in claim 2, further comprising:
first switching means for coupling said receiving means to a first voltage source;
second switching means for activating said array and said summing means; and
means ganging said first switching means to said second switching means to enable the resetting of said apparatus.

4. The apparatus as claimed in claim 3, wherein said array includes:
a plurality of light-activated silicon controlled rectifiers each having an anode, a cathode, and a gate electrode;
means coupling each of said cathodes to a point of reference potential;
a like plurality of first resistors for coupling said gate electrodes to said point of reference potential;
a like plurality of second resistors and a like plurality of third resistors, each second resistor and each third resistor being joined together in serial relation between said second switching means and a point of reference potential, the connections of said second resistors with said third resistors forming common junctions; and
means coupling each of said common junctions to each of said anodes, respectively.

5. The apparatus as claimed in claim 4, wherein said summing means includes:
a like plurality of diodes having anodes and cathodes;
a like plurality of fourth resistors joining said common junctions to said diode-anodes, respectively;
means joining said diode-cathodes together; and
current indicating means coupling said joining means to a point of reference potential for indicating the area of the opaque article held by said holding means.

6. A method of measuring the cross-sectional area of an opaque article comprising:
inserting the article between a light source and an array of photosensitive electrical elements such that an integral number thereof are unaffected by light and thereupon produce appreciable output signals; and
electrically summing said output signals of said integral number to achieve a value which is a function of said area.

7. The method as claimed in claim 6, further comprising visually indicating the electrical sum.

References Cited

UNITED STATES PATENTS

| | | | |
|---|---|---|---|
| 2,049,540 | 8/1936 | Hart | 356—157 |
| 2,630,043 | 3/1953 | Kolisch | 250—222 |
| 2,719,236 | 9/1955 | Soltis | 356—157 |
| 3,259,022 | 7/1966 | Vietorisz | 250—222 |
| 3,418,481 | 12/1968 | Dym et al. | 307—117 |

FOREIGN PATENTS

| | | |
|---|---|---|
| 1,073,296 | 1954 | France. |

RONALD L. WIBERT, Primary Examiner

J. ROTHENBERG, Assistant Examiner

U.S. Cl. X.R.

250—222